US009005726B2

(12) United States Patent
Matsubara et al.

(10) Patent No.: US 9,005,726 B2
(45) Date of Patent: Apr. 14, 2015

(54) RECORDING MEDIUM FOR INK JET INK, INK JET PRINTED MATERIAL, AND METHOD FOR PRODUCING THE SAME

(71) Applicant: DIC Corporation, Tokyo (JP)

(72) Inventors: Hiroaki Matsubara, Satte (JP); Takeo Ikeda, Satte (JP); Yoshitaka Satoh, Sakura (JP); Hiroshi Harada, Kitaadachi-gun (JP); Yoshihiro Sato, Kitaadachi-gun (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/345,095

(22) PCT Filed: Sep. 25, 2012

(86) PCT No.: PCT/JP2012/074505
§ 371 (c)(1),
(2) Date: Mar. 14, 2014

(87) PCT Pub. No.: WO2013/047491
PCT Pub. Date: Apr. 4, 2013

(65) Prior Publication Data
US 2014/0349037 A1 Nov. 27, 2014

(30) Foreign Application Priority Data

Sep. 30, 2011 (JP) ................................. 2011-216922
Oct. 21, 2011 (JP) ................................. 2011-231686
Oct. 26, 2011 (JP) ................................. 2011-234934
Nov. 21, 2011 (JP) ................................. 2011-253871
Nov. 22, 2011 (JP) ................................. 2011-254976

(51) Int. Cl.
| | | |
|---|---|---|
| B41M 5/00 | (2006.01) | |
| B41M 5/52 | (2006.01) | |
| C09D 11/30 | (2014.01) | |
| C08F 10/04 | (2006.01) | |
| C08F 18/02 | (2006.01) | |
| C09D 11/32 | (2014.01) | |
| C08F 12/32 | (2006.01) | |
| C08F 12/04 | (2006.01) | |
| C08F 18/14 | (2006.01) | |
| C08F 10/14 | (2006.01) | |
| C08F 16/04 | (2006.01) | |
| B32B 27/32 | (2006.01) | |
| B41J 2/01 | (2006.01) | |

(52) U.S. Cl.
CPC .............. *B41M 5/5254* (2013.01); *C09D 11/30* (2013.01); *C08F 10/04* (2013.01); *C08F 18/02* (2013.01); *C09D 11/32* (2013.01); *B41M 5/0047* (2013.01); *C08F 12/32* (2013.01); *B41M 5/0023* (2013.01); *C08F 12/04* (2013.01); *C08F 18/14* (2013.01); *C08F 10/14* (2013.01); *C08F 16/04* (2013.01); *B32B 27/32* (2013.01); *B41J 2/01* (2013.01)

(58) Field of Classification Search
CPC .. B41M 5/0023; B41M 5/0047; C09D 11/30; C09D 11/32; C08F 10/04; C08F 10/14; C08F 12/04; C08F 12/32; C08F 16/10; C08F 18/02; C08F 18/14
USPC ....................................... 428/32.38; 347/105
See application file for complete search history.

(56) References Cited

U.S. PATENT DOCUMENTS

2002/0119274 A1* 8/2002 Yang et al. .................. 428/40.1
2003/0068574 A1* 4/2003 Shiraki et al. .............. 430/270.1

FOREIGN PATENT DOCUMENTS

| JP | 39-012838 B | 7/1964 |
|---|---|---|
| JP | 47-019824 A | 9/1972 |
| JP | 48-028067 A | 4/1973 |
| JP | 52-042114 A | 4/1977 |
| JP | 09-001920 A | 1/1997 |
| JP | 10-119428 A | 5/1998 |
| JP | 2001-150612 A | 6/2001 |
| JP | 2001-181424 A | 7/2001 |
| JP | 2001-198998 A | 7/2001 |
| JP | 2002-103802 A | 4/2002 |
| JP | 2002-219851 A | 8/2002 |
| JP | 2004-075181 A | 3/2004 |
| JP | 2004-134440 A | 4/2004 |
| JP | 2004-531416 A | 10/2004 |
| JP | 2006-213065 A | 8/2006 |
| JP | 2007-130780 A | 5/2007 |
| JP | 2008-080543 A | 4/2008 |
| JP | 2010-228192 A | 10/2010 |
| JP | 2010-234660 A | 10/2010 |
| WO | 2007/007547 A1 | 1/2007 |

OTHER PUBLICATIONS

International Search Report, dated Dec. 25, 2012, issued in corresponding application No. PCT/JP2012/074505.
Ueno, Tomikazu, "XPS Analysis of Surface of Polymer Films Utilizing Chemical Modification", JSR Technical Review No. 119/2012, pp. 14-18, w/partial English translation.

\* cited by examiner

*Primary Examiner* — Betelhem Shewareged
(74) *Attorney, Agent, or Firm* — Westerman, Hattori, Daniels & Adrian, LLP

(57) ABSTRACT

The present invention provides a recording medium for an ink jet ink, which is capable of printing directly with an ink jet ink without a surface treatment step necessary for use of an ordinal plastic film as a substrate and which causes no problem of peeling or the like after printing, and also provides a printed material produced by ink jet printing on the recording medium and a production method therefor. Specifically, printing is performed with various ink jet inks on a layer (A) of a single-layer or multi-layer film (I) used as a recording medium, the layer (A) containing a cyclic polyolefin resin or an acid-modified polyolefin resin.

8 Claims, No Drawings

RECORDING MEDIUM FOR INK JET INK, INK JET PRINTED MATERIAL, AND METHOD FOR PRODUCING THE SAME

TECHNICAL FIELD

The present invention relates to an ink jet recording medium permitting ink jet printing even on plastic substrates, and particularly relates to a recording medium for ink jet inks which has excellent adhesion between ink jet inks and plastic substrates and causes no peeling of printed surfaces after printing or the like and to a printed material.

BACKGROUND ART

In recent years, regardless of business use or consumer use, ink jet printers have been popularized with technical development of multimedia. The ink jet printers have many characteristics such as ease of multi-coloring and increases in size of images, the capability of printing not only on smooth surfaces but also on uneven surfaces, the capability of on-demand printing, and the like.

Ink jet recording materials including paper as a support have the problem of causing a phenomenon called "cockling" in which the support waves or the problem of worsening the appearance due to breakage when coming into contact with water. In order to resolve the problem, it has been proposed to use an ink jet recording medium including a plastic film as a support and an ink-receiving layer provided on the support and print on the recording medium (refer to, for example, Patent Literatures 1 to 4). Such a medium is excellent in water resistance and can be used as outdoor advertising and poster, a label, wallpaper, and the like. However, a surface of the plastic film has low adhesion to ink jet inks and thus requires a step of forming a layer, which is referred to as an anchor layer, a primer layer, an undercoating layer, an adhesive layer, or the like, on the film surface and then providing the ink-receiving layer composed of polyurethane, polyacryl, or the like as a main component on the layer. This surface treatment step results in an increase in cost and an increase in number of steps, and thus much time is required for production. Further, surface treatment performed by applying a coating material containing a solvent requires a step of removing the solvent contained, and when the solvent is an organic solvent, environmental loading is increased. On the other hand, a recording medium for ink jet has been proposed, in which an ink-receiving agent is not applied, instead micropores are provided in a film surface so that an ink is fixed by being absorbed by the micropores (refer to, for example, Patent Literature 5). However, a stretching step is required, and the film becomes white due to irregular reflection of light by the micropores, thereby limiting application to some of the fields in which transparent is required.

CITATION LIST

Patent Literature

PTL 1: Japanese Unexamined Patent Application Publication No. 10-119428

PTL 2: Japanese Unexamined Patent Application Publication No. 2001-150612

PTL 3: Japanese Unexamined Patent Application Publication No. 2002-103802

PTL 4: Japanese Unexamined Patent Application Publication No. 2007-130780

PTL 5: Japanese Unexamined Patent Application Publication No. 2001-181424

SUMMARY OF INVENTION

Technical Problem

In consideration of the above-described problems, a problem of the present invention is to provide a recording medium for ink jet inks which has good adhesion to inks without surface treatment and stretching steps necessary for use of a usual plastic film as a substrate, and which causes no problem such as peeling after ink jet printing or the like, and to provide a printed material.

Solution to Problem

As a result of keen research for solving the problem, the inventors found that the problem can be solved by using as an ink jet recording medium a single-layer or multi-layer film (I) including a layer (A) which contains a cyclic polyolefin resin (a1) and/or an acid-modified polyolefin resin (a2), leading to the achievement of the present invention.

That is, the present invention provides a printed material produced by ink jet printing on a layer (A) of a single-layer or multi-layer film (I) including the layer (A), the layer (A) containing a cyclic polyolefin resin (a1) and/or an acid-modified polyolefin resin (a2), a method for producing the printed material, and a recording medium for ink jet inks suitable for producing the printed material.

Advantageous Effects of Invention

An ink jet printed material according to the present invention is easily produced by direct ink jet printing on a plastic film. A design thereof can be easily changed by multilayering the film and selecting a layer configuration of the film according to intended performance (transparency, rigidity, processability, and the like) and application (a packaging material, a poster, a label, and the like), thereby causing excellent versatility. The resultant printed material has good adhesion between ink and the film and thus causes no peeling of a printed portion or the like even after long-term storage, and can be directly used or can be formed into a bag or the like by secondary processing.

DESCRIPTION OF EMBODIMENTS

A plastic film serving as a support of an ink jet printed material of the present invention includes at least a layer (A) containing a cyclic polyolefin resin (a1) and/or an acid-modified polyolefin resin (a2). The layer A has the function as the support as well as the function as an easily adhesive layer for inks. In the present invention, the term "as a main component" represents that a specified resin is contained at 80% by mass or more, preferably 85% by mass or more, relative to the total amount of a resin composition constituting a layer. In addition, the term "contains" represents that a specified resin is contained at 1% by mass or more, preferably 20% by mass or more, relative to the total amount of a resin composition constituting a layer.

Examples of the cyclic polyolefin resin (a1) include norbornene-based polymers, vinyl alicyclic hydrocarbon polymers, cyclic conjugated diene polymers, and the like. Among these, norbornene-based polymers are preferred. Also, Examples of the norbornene-based polymers include ring-opened polymers (hereinafter referred to as "COP") of norbornene-based monomers, norbornene-based copolymers (hereinafter referred to as "COC") produced by copolymerizing norbornene-based monomers with an olefin such as ethylene or the like. Further, hydrogenated products of COP and COC are particularly preferred. In addition, the cyclic olefin resin preferably has a weight-average molecular weight of 5,000 to 500,000 and more preferably 7,000 to 300,000.

The norbornene-based monomers used as raw materials of the norbornene-based polymers are alicyclic monomers having a norbornene ring. Examples of such norbornene-based monomers include norbornene, tetracyclododecene, ethylidene norbornene, vinylnorbornene, ethylidene tetracyclododecene, dicyclopentadiene, dimethano-tetrahydrofluorene, phenylnorbornene, methoxycarbonyl norbornene, methoxycarbonyl tetracyclododecene, and the like. These norbornene-based monomers may be used alone or in combination of two or more.

The norbornene-based copolymers are produced by copolymerizing the norbornene-based monomers with copolymerizable olefin, and examples of the olefin include olefins having 2 to 20 carbon atoms, such as ethylene, propylene, 1-butene, and the like; cycloolefins such as cyclobutene, cyclopentene, cyclohexene, and the like; and nonconjugated dienes such as 1,4-hexadiene and the like. These olefins may be used alone or in combination of two or more.

Commercial products of a norbornene-based monomer ring-opened polymer (COP) which can be used as the cyclic polyolefin resin (a1) include "ZEONOR" manufactured by Zeon Corporation, and the like, and examples of a norbornene-based copolymer (COC) include "APEL" manufactured by Mitsui Chemicals Inc., "TOPAS" manufactured by Polyplastics Co., Ltd., and the like.

The content of the cyclic polyolefin resin (a1) in the resin components which form the layer (A) is preferably 50% by mass or more and particularly preferably 80% by mass or more in view of ease of an increase in the degree of surface treatment of the resultant single-layer or multi-layer film (recording medium) (1) and adhesion to ink jet inks.

The glass transition point (Tg) of the cyclic polyolefin resin (a1) is preferably 60° C. or more in view of rigidity of the resultant film (I). In the case of the multilayer film (I) formed by further laminating a layer (B) composed of a polyolefin resin (b) as a main component in order to exhibit easy peelability as described below, Tg is preferably 200° C. or less in view of the point that the film can be produced by a co-extrusion lamination method and raw materials are industrially easily available. In particularly, Tg is preferably 70° C. to 180° C. The cyclic polyolefin resin (a1) having such Tg preferably contains a norbornene-based monomer at a ratio of 30 to 90% by mass, more preferably 40 to 90% by mass, and still more preferably 50 to 85% by mass. At a content ratio within this range, rigidity and processing stability of the film are improved. In the present invention, a glass transition temperature and melting point are measured by differential scanning calorimetry (DSC).

On the other hand, the norbornene-based copolymer having a high glass transition point (Tg) has low tensile strength and thus may be very easily cut or easily torn, and thus a blend of a high-Tg resin and a low-Tg resin having a glass transition point of less than 100° C. is also preferably used in view of a balance between take-up or winding properties during film deposition and slitting and heat seal strength. Also, the multilayer film (I) produced by laminating the layer (B) composed of a polyolefin resin (b) as a main component as described below is preferred in view of packaging mechanical properties (from the viewpoint that wrinkling or shrinkage does not occur in a seal surface during bag making and article packing, and pinholes or the like are not produced in a heat seal portion).

In particular, when a bag is easily torn or broken by dropping during transport due to very high rigidity, a sealing start temperature is excessively high for use as a package, or maintenance of strength (hot tackiness) immediately after heat sealing is improved, bag drop-strength and packaging mechanical properties can be improved by mixing COC having a Tg of less than 100° C. Also, it is effective to mix a polyolefin resin not having a cyclic structure and having good compatibility with COC or a rubber-based elastomer resin having a low melting point and low Tg.

The layer (A) of the present invention may be a layer containing the acid-modified polyolefin resin (a2). An olefin component as a main component of the acid-modified polyolefin resin (a2) is not particularly limited, but alkenes having 2 to 6 carbon atoms, such as ethylene, propylene, isobutylene, 2-butene, 1-butene, 1-pentene, 1-hexene, and the like, are preferred, and these may be used as a mixture. Among these, alkenes having 2 to 4 carbon atoms, such as ethylene, propylene, isobutylene, 1-butene, and the like, are more preferred, and ethylene and propylene are still more preferred, and ethylene is most preferred. The acid-modified polyolefin resin (a2) is required to contain a (meth)acrylic acid ester component. Examples of the (meth)acrylic acid ester component include methyl(meth)acrylate, ethyl(meth)acrylate, propyl(meth)acrylate, butyl(meth)acrylate, hexyl(meth)acrylate, octyl(meth)acrylate, decyl(meth)acrylate, lauryl(meth)acrylate, octyl(meth)acrylate, dodecyl(meth)acrylate, stearyl (meth)acrylate, and the like. In view of easy availability and adhesiveness, methyl(meth)acrylate, ethyl(meth)acrylate, butyl(meth)acrylate, and hexyl(meth)acrylate are more preferred, and methyl(meth)acrylate and ethyl(meth)acrylate are still more preferred. The form of the (meth)acrylic acid ester component is not limited as long as it is copolymerized with the olefin component. Examples of the form of copolymerization include random copolymerization, block copolymerization, graft copolymerization (graft modification), and the like. (In addition, "(meth)acrylic acid" represents "acrylic acid or methacrylic acid".) Specific examples of an ethylene-(meth)acrylic acid ester copolymer include Elvaloy (trade name: manufactured by Mitsui DuPont Polychemical Co., Ltd.), Acryft (trade name: manufactured by Sumitomo Chemical Co., Ltd.), and the like. These may be used alone or as a mixture of two or more.

Also, the acid-modified polyolefin resin (a2) may be produced by acid-modification with an unsaturated carboxylic acid component. Examples of the unsaturated carboxylic acid component include acrylic acid, methacrylic acid, maleic acid, maleic anhydride, itaconic acid, itaconic anhydride, fumaric acid, crotonic acid, half esters and half amides of unsaturated dicarboxylic acids, and the like. Among these, acrylic acid, methacrylic acid, maleic acid, and maleic anhydride are preferred, and acrylic acid and maleic anhydride are particularly preferred. The form of the unsaturated carboxylic acid component is not limited as long as it is copolymerized with the olefin component. Examples of the form of copolymerization include random copolymerization, block copolymerization, graft copolymerization (graft modification), and the like. Specific examples of an ethylene-acrylic acid copolymer include Nucrel (trade name: manufactured by Mitsui Dupont Polychemical Co., Ltd.) and the like. Examples of an ethylene-(meth)acrylic acid ester-maleic anhydride copolymer include Bondine (trade name: manufactured by Tokyo Zairyo Co., Ltd.) and the like. These may be used alone or as a mixture of two or more.

The rate of acid modification of the acid-modified polyolefin resin (a2) is preferably 0.5 to 40%, more preferably 0.5 to 35%, and particularly preferably 0.5 to 30% in view of excellent balance between adhesion to ink jet inks and suppression of blocking during storage of a coil of the film (I), suppression of appearance defects such as wrinkles after printing or the like.

In the present invention, the layer (A) may further contains another resin in combination with the acid-modified polyolefin resin (a2). In particular, a polyolefin resin is preferably combined in view of easy mixing with the acid-modified polyolefin resin (a2) and easy production of the multilayer film (I) having the layer (B) composed of the polyolefin resin (b) as a main component by co-extrusion of the layer (A) and the layer (B) as described below. In this case, the layer (A) preferably contains the acid-modified olefin resin (a2) at 20 parts by mass or more and particularly preferably 50 parts by mass or more in 100 parts by mass of the resin components constituting the layer (A).

Also, the layer (A) of the present invention may contain the acid-modified polyolefin resin (a2) in combination with the cyclic polyolefin resin (a1), and in this case, in view of excellent adhesion to inks, the layer (A) preferably contains the cyclic polyolefin resin (a1) and the acid-modified polyolefin resin (a2) at a total mass of 50 parts by mass or more in 100 parts by mass of the resin components constituting the layer (A).

In the resin layer (A), a homopolymer or copolymer of α-olefin having 2 to 6 carbon atoms can be used as the polyolefin resin which can be combined with the cyclic polyolefin resin (a1) or the acid-modified polyolefin resin (a2). The type of copolymerization may be either a block copolymer or a random copolymer. Examples of the polyolefin resin include a polyethylene resin, a polypropylene resin, and the like.

In order to easily exhibit high heat-seal strength for use as a packaging material and maintain pin-hole resistance and interlayer strength of a laminate with the layer (B) described below, the polyethylene resin preferably has a density of 0.900 to 0.950 g/cm$^3$ and more preferably a density of 0.905 to 0.945 g/cm$^3$.

Examples of the polyethylene resin include polyethylene resins such as very-low-density polyethylene (VLDPE), linear low-density polyethylene (LLDPE), low-density polyethylene (LDPE), and the like, ethylene-vinyl acetate copolymer (EVA), and the like, which may be used alone or as a mixture of two or more. Among these, VLDPE, LDPE, LLDPE, and MLDPE are preferred because of good balance between sealability, rigidity, adhesion to inks.

LDPE may be a branched low-density polyethylene produced by a high-pressure radical polymerization method and is preferably a branched low-density polyethylene produced by a high-pressure radical polymerization method of homopolymerization of ethylene.

LLDPE and MLDPE are produced by a low-pressure radical polymerization method using a single-site catalyst, in which an ethylene monomer as a main component is copolymerized with α-olefin as a comonomer, such as butane-1, hexane-1, octane-1,4-methylpentene, or the like. The content of the comonomer in LLDPE is preferably in a range of 0.5 to 20 mol % and more preferably in a range of 1 to 18 mol %.

Examples of the single-site catalyst include various single-side catalysts such as metallocene catalysts each including combination of a metallocene compound of group IV or group V transition metal in the periodic table and an organic aluminum compound and/or ionic compound, and the like. Also, the single-site catalyst has uniform active sites, and thus, as compared with a multi-site catalyst having nonuniform active sites, the resultant resin has a sharp molecular weight distribution and thus causes little precipitation of low-molecular-weight components and has the physical properties of excellent stability of sealing strength and anti-blocking property when formed into a film.

As described above, the density of the polyethylene resin is 0.900 to 0.950 g/cm$^3$. The density within this range causes proper rigidity and excellent mechanical strength such as heat-seal strength, pin-hole resistance, and the like, and improves film formability and extrudability. In general, the melting point is preferably within a range of 60° C. to 130° C. and more preferably 70° C. to 125° C. The melting point within this range improves processing stability and extrudability when the polyethylene resin is used as a mixture with the cyclic polyolefin resin (a1) and the acid-modified polyolefin resin (a2). The polyethylene resin preferably has a melt flow rate (hereinafter referred to as "MFR at 190° C."; a value measured at 190° C. and 21.18 N according to JIS K7210: 1999) of 2 to 20 g/10 min and more preferably 3 to 10 g/10 min. With MFR at 190° C. within this range, extrudability of a film is improved.

Such a polyethylene resin has good compatibility with the cyclic polyolefin resin (a1) and the acid-modified polyolefin resin (a2), and thus transparency of the film (I) can be maintained. Also, interlayer adhesive strength between the layer (A) and the layer (B) described below can be maintained without using an adhesive resin or the like, and the resin also has flexibility, thereby causing good pin-hole resistance. Further, in order to improve the pin-hole resistance, LLDPE or MLDPE is preferably used.

Examples of the polypropylene resin include propylene homopolymers, propylene-α-olefin random copolymers, for example, propylene-ethylene copolymer, propylene-butene-1 copolymer, and propylene-ethylene-butene-1 copolymer, metallocene catalyst-based polypropylene, and the like. These may be used alone or in combination. The propylene-α-olefin random copolymers are preferred, and propylene-α-olefin random polymers polymerized by using a metallocene catalyst are particularly preferred. Use of the polypropylene resin can improve heat resistance of a film and thus can increase the softening temperature, thereby permitting use as a packaging material excellent in the characteristics of boiling or hot packing at 100° C. or less or steam high-pressure heat-sterilization such as retort sterilization or the like at 100° C. or more.

Also, the polypropylene resin preferably has a MFR at 230° C. of 0.5 to 30.0 g/10 min and a melting point of 110° C. to 165° C., and more preferably a MFR at 230° C. of 2.0 to 15.0 g/10 min and a melting point of 115° C. to 162° C. With the MFR and melting point within the respective ranges, the film little shrinks during heat sealing, and film formability is also improved.

In addition, as described above, when a printed material of the present invention is used as a packaging material, in order to improve heat sealability and impart easy openability or the like, the multilayer film (I) can be formed by laminating the layer (B) composed of a polyolefin resin (b) as a main component on the layer (A) containing the cyclic polyolefin resin (a1) and/or the acid-modified polyolefin resin.

A homopolymer or copolymer of α-olefin having 2 to 6 carbon atoms can be used as the polyolefin resin (b) of the layer (B). The type of copolymerization may be either a block copolymer or a random copolymer. The polyolefin resin (b) preferably has a melting point of 110° C. or more from the viewpoint of maintaining an appearance during molding after recording and suppressing warpage of the film.

For example, any one of polyolefin resins known as polypropylene resin (b-1), polyethylene resin (b-2), and the like can be used as the polyolefin resin (b). Examples of the polypropylene resin (b-1) include a propylene homopolymer, a propylene-ethylene copolymer, a propylene-butene-1 copolymer, a propylene-ethylene-butene-1 copolymer, an ethylene-propylene block copolymer, a metallocene catalyst-based polypropylene, and the like. These may be used alone or in combination of two or more. When a recording medium for ink jet ink before ink jet printing is rolled and stored over a long time, a crystalline propylene resin is preferably used from the viewpoint of preventing blocking. In this application, the term "crystalline" represents that a peak of 0.5 J/g or more appears within a range of 95° C. to 250° C. in DSC (differential scanning calorimetry).

Also, the polypropylene resin (b-1) preferably has a MFR at 230° C. of 0.5 to 30.0 g/10 min and a melting point of 120° C. to 165° C., and more preferably a MFR at 230° C. of 2.0 to 15.0 g/10 min and a melting point of 125° C. to 162° C. With the MFR and melting point within the respective ranges, the film little shrinks during heat molding or the like of a printed material, and thus the appearance of a printed surface can be maintained and warpage of the medium does not occur, thereby improving film formability of a co-extruded multilayer film. In addition, the density is preferably 0.890 to 0.910 g/cm$^3$ and more preferably 0.895 to 0.905 g/cm$^3$.

In particular, in use of a propylene-ethylene block copolymer, a surface is improved to a satin-like surface, and the occurrence of wrinkles can be suppressed when the multilayer film is rolled. Also, blocking can be reduced during storage of a roll. The propylene-ethylene block copolymer is a resin produced by block polymerization of propylene and ethylene, and is, for example, a propylene-ethylene block copolymer produced by polymerizing ethylene in the presence of a propylene homopolymer or polymerizing ethylene and propylene, or the like.

In addition, when a mixed resin of crystalline propylene resin and ethylene-propylene rubber (hereinafter referred to as "EPR") is used for the layer (B), a surface of the layer (B) can be easily modified to a stain-like surface. In this case, the crystalline propylene resin used is preferably a versatile propylene homopolymer. On the other hand, the EPR used is preferably has a weight-average molecular weight within a range of 400,000 to 1,000,000 in view of the point that a surface can be modified to a stain-like surface by forming irregularity on the surface of the film, and more preferably within a range of 500,000 to 800,000. The content of EPR in the mixed resin is preferably in a range of 5 to 35% by mass in view of the point that a film surface can be uniformly modified to a stain-like surface. The mixed resin of the crystalline propylene polymer and EPR preferably has a MFR at 230° C. within a range of 0.5 to 15 g/10 min in view of ease of extrusion. The weight-average molecular weight of the EPR is determined by calculation based on GPC (gel permeation chromatography) of a component extracted by cross-fractionation at 40° C. using ortho-dichlorobenzene as a solvent. Also, the content of the EPR in the mixed resin is determined from the amount of EPR extracted by cross-fractionation at 40° C. using ortho-dichlorobenzene as a solvent.

Examples of a method for producing the mixed resin of the crystalline propylene resin and EPR include, but are not particularly limited to, a method of producing each of the propylene homopolymer and ethylene-propylene rubber using a Ziegler catalyst by a solution polymerization method, a slurry polymerization method, a vapor-phase polymerization method, or the like, and then mixing both by a mixer, a two-step polymerization method of producing a propylene homopolymer in a first step and then producing EPR in the presence of the produced polymer in a second step, and the like.

The Ziegler catalyst is a so-called Ziegler-Natta catalyst including, for example, combination of a carrier-supported catalyst and a co-catalyst composed of an organic metal compound such as an organic aluminum compound or the like, the carrier-supported catalyst being produced by supporting a transition metal compound on a carrier composed of a transition metal compound, such as a titanium-containing compound or the like, or a magnesium compound.

Medium-density polyethylene (MDPE), high-density polyethylene (HDPE), or the like can be used as the polyethylene resin (b-2), and the density thereof is preferably 0.92 to 0.97 g/cm$^3$. The density within this range causes proper rigidity and improves film formability and extrudability. The polyethylene resin (b-2) preferably has a MFR at 190° C. of 2 to 20 g/10 min and more preferably 3 to 10 g/10 min. With MFR at 190° C. within this range, extrudability of a film is improved, and the occurrence of wrinkles which easily occur in rolling the multilayer film can be suppressed, thereby causing excellent feedability from a roll. Further, the melting point of the polyethylene resin (b-2) is preferably 110° C. to 135° C. and more preferably 115° C. to 130° C. With the melting point within this range, the appearance of a record surface can be maintained because of little shrinkage of the film when the film is heated by molding after printing, and warping of the film can also be suppressed. The polyethylene resins may be used alone or in combination of two or more.

The layer (B) composed of the polyolefin resin (b) as a main component may have a single layer or a multilayer structure including two or more layers. In view of more excellent rigidity and heat resistance and excellent processability of secondary processing of a printed material, the layer (B) is preferably a single layer or multilayer-structure film composed of the polypropylene resin (b-1) as a main component. For example, when a printed material is used as a package, as described in Japanese Unexamined Patent Application Publication No. 2006-213065, a surface opposite to a printed surface includes as the outermost layer a heat-seal layer containing a 1-butene copolymer composed of 1-butene and propylene as essential components and a copolymer composed of propylene and ethylene as essential components, thereby forming an easily openable bag. Similarly, when the printed material is used as a cover material, the cover material having easy openability can be produced by a multilayer structure described in Japanese Unexamined Patent Application Publication Nos. 2004-75181 and 2008-80543.

In addition, by providing an adhesive layer on the layer (B) [surface opposite to the layer (A)], an ink jet printed material (label) which can be attached to an advertising sign, a vehicle, or the like can be formed. Examples of the type of the adhesive include, but not particularly limited to, natural rubber-based, synthetic rubber-based, acrylic, urethane-based, vinyl ether-based, silicone-based, amide-based, and styrene-based adhesives, styrene-based elastomers, olefin-based elastomers, and the like. If required, for the purpose of controlling adhesive properties, the adhesive layer can be mixed with a proper tackifier, for example, a terpene-based resin such as an α-pinene or β-pinene polymer, a diterpene polymer, an α-pinene-phenol copolymer, or the like, a hydrocarbon resin such as an aliphatic, aromatic, or aliphatic-aromatic copolymer, or the like, a rosin-based resin, a coumarone-indene resin, an (alkyl)phenol resin, a xylene-based resin, or the like. In particular, when the layer (A) and the layer (B) are laminated by a co-extrusion method, a method of simultaneously laminating the adhesive layer on the layer (B) opposite to the layer (A) by co-extrusion is preferred in view of the production cycle.

If required, components such as an anti-fogging agent, an antistatic agent, a heat stabilizer, a nucleating agent, an anti-oxidant, a lubricant, an anti-blocking agent, a mold release agent, an ultraviolet absorber, a colorant, etc. can be added to each of the layers (A) and (B) within a range which does not impair the object of the present invention. In particular, in order to impart processability of film forming and package-ability when a printed material is used as a packaging material, a surface friction coefficient is preferably 1.5 or less, particularly 1.0 or less, and thus a lubricant, an anti-blocking agent, or an antistatic agent is preferably appropriately added to a layer corresponding to a surface layer of the film.

The thickness of the film (I) of the present invention can be appropriately determined according to application of the printed material, but, for example, in the case of a packaging material (bag or cover material), the thickness is preferably 20 μm to 50 μm, and in the case of a label or poster, a multilayer film having a thickness within a range of 70 μm to 1000 μm is preferably used.

In addition, in the case of the multilayer film (I), a ratio of the thickness of the layer (B) to the total thickness of the layers (A) and (B) is preferably within a range of 5% to 85% and particularly preferably within a range of 10% to 40% from the viewpoint that adhesion to ink jet inks described below can be secured. In the case of a packaging material (bag or cover material), the thickness of the layer (B) is preferably within a range of 2 μm to 30 μm.

In the case of the multilayer film (I), a method for laminating the layer (A) and the layer (B) is preferably a co-extrusion lamination molding method in which the layer (A) and the layer (B) are laminated adjacent to each other. For example, the method preferably includes laminating the layer (A) and the layer (B) in a melt state by a co-extrusion method, such as a co-extrusion multilayer die method, a feed block method, or the like, for melt-extrusion using two or more extruders and then forming a long rolled film by a method such as inflation, a T-die-chill roll method, or the like. A co-extrusion method using a T-die is more preferred.

Also, in producing the multilayer film, a surface of the layer (A) is preferably continuously surface-treated by corona discharge or plasma discharge under heating or in an atmosphere of inert gas. A surface of the layer (A) is preferably treated with a degree of surface treatment of 40 dyne/cm or more in order to enhance the adhesion to ink jet inks. A treatment method is not particularly limited, but a surface of the layer (A) is preferably continuously surface-treated by corona discharge or plasma discharge under heating or in an atmosphere of inert gas.

Examples of a method of corona treatment include, but are not particularly limited to, treatment methods described in Japanese Examined Patent Application Publication No. 39-12838 and Japanese Unexamined Patent Application Publication Nos. 47-19824, 48-28067, and 52-42114, etc. A solid state corona treater manufactured by Pillar Corporation, a Lepel type surface treater, Vetaphon-type treater, or the like can be used as a corona discharge treatment apparatus. The treatment can be performed at atmospheric pressure in air. During the treatment, the discharge frequency is 5 kV to 40 kV and more preferably 10 kV to 30 kV, and a waveform is preferably an alternating-current sine wave. The gap transparent lance between an electrode and a dielectric roll is preferably 0.1 mm to 10 mm and more preferably 1.0 mm to 2.0 mm. The discharge treatment is preferably performed above a dielectric support roller provided in a discharge band in a treatment amount of 0.34 kV·A·min/m$^2$ to 0.4 kV·A·min/m$^2$ and more preferably 0.344 kV·A·min/m$^2$ 0.38 kV·A·min/m$^2$.

In the present invention, when the layer (A) of the film (I) contains the cyclic polyolefin resin (a1), the degree of corona treatment is more improved as compared with treatment of a polyolefin resin not having a cyclic structure. The degree of treatment can be determined to be high or low by, for example, measuring surface tension with a wetting reagent, and in use of the cyclic polyolefin resin (a1), the degree of treatment can be easily improved to 40 dyne/cm or more and also can be improved to 50 dyne/cm or more. The high degree of corona treatment is supposed to contribute to the expression of adhesion to an ink jet ink and suppress peeling of a printed surface. In particular, when an aqueous ink described below is used, the degree of treatment is preferably increased. In general, even with a polyester film which is known to be increased in the degree of corona treatment, the upper limit is about 45 dyne/cm, and the degree of surface treatment cannot be easily maintained high for a long time because of large change over time. The film (I) using the cyclic polyolefin resin (a1) causes very little deterioration in a corona-treated surface over time, and thus can be subjected to ink jet printing after the film (I) is stored for several months.

A printed material obtained according to the present invention is produced by ink jet printing on the layer (A) of the film (I) produced as described above.

(Ink Jet Ink)

Ink jet inks used in the present invention are not particularly limited, and various inks can be used. Known ink jet inks include an aqueous ink using as a main solvent water or a mixed solvent of water and a water-soluble organic solvent, a non-aqueous ink (oil-based) ink using an organic solvent as a main solvent, a UV curable ink not using the solvent, and the like. However, since the film used in the present invention exhibits good adhesion to not only an oil-based ink and UV curable ink which have good adhesion to a plastic film, but also an aqueous ink which easily causes cissing or the like, these inks can be used without any problem.

(Colorant)

Pigments and dyes are generally used as colorants used for the ink jet inks, but pigments are preferably used in view of durability of the printed material. Examples of the dyes include various dyes generally used for ink jet recoding, such as direct dyes, acid dyes, food dyes, basic dyes, reactive dyes, disperse dyes, vat dyes, soluble vat dyes, reactive disperse dyes, and the like. Examples of the pigments include inorganic pigments such as barium sulfate, lead sulfate, titanium oxide, lead yellow, iron red, chromium oxide, carbon black, and the like, anthraquinone pigments, perylene pigments, disazo pigments, phthalocyanine pigments, isoindoline pigments, dioxazine pigments, quinacridone pigments, perinone pigments, benzimidazolone pigments, and the like. These can be used alone or as a mixture.

In general-purpose color printing, a black ink, a cyan ink, a magenta ink, and a yellow ink using a black pigment, a cyan pigment, a magenta pigment, and a yellow pigment, respectively, are used.

Carbon black such as furnace black, lamp black, acetylene black, channel black, and the like, and titanium black, and the like, which have excellent light resistance and high covering powder, are used as black pigments.

Further, among typical organic pigments of the three primary colors of cyan, magenta, and yellow, examples of pigments which can be preferably used in the present invention are given below.

Examples of cyan pigments include C. I. Pigment Blue 1, C. I. Pigment Blue 2, C. I. Pigment Blue 3, C. I. Pigment Blue 15, C. I. Pigment Blue 15:1, C. I. Pigment Blue 15:3, C. I. Pigment Blue 15:4, C. I. Pigment Blue 16, C. I. Pigment Blue 22, C. I. Pigment Blue 60, and the like.

Examples of magenta pigments include C. I. Pigment Red 5, C. I. Pigment Red 7, C. I. Pigment Red 12, C. I. Pigment Red 48, C. I. Pigment Red 48:1, C. I. Pigment Red 57, C. I. Pigment Red 112, C. I. Pigment Red 122, C. I. Pigment Red 123, C. I. Pigment Red 146, C. I. Pigment Red 168, C. I. Pigment Red 184, C. I. Pigment Red 202, C. I. Pigment Violet 19, and the like.

Examples of yellow pigments include C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 73, C. I. Pigment Yellow 74, C. I. Pigment Yellow 75, C. I. Pigment Yellow 83, C. I. Pigment Yellow 93, C. I. Pigment Yellow 95, C. I. Pigment Yellow 97, C. I. Pigment Yellow 98, C. I. Pigment Yellow 109, C. I. Pigment Yellow 114, C. I. Pigment Yellow 128, C. I. Pigment Yellow 129, C. I. Pigment Yellow 138, C. I. Pigment Yellow 151, C. I. Pigment Yellow 154, C. I. Pigment Yellow 155, and the like.

The particle diameter of the pigments is preferably within a range of 1 to 500 nm and more preferably within a range of 20 to 200 nm in terms of primary particle diameter. Also, the particle diameter of the pigments after dispersion in a medium is preferably within a range of 10 to 300 nm and more preferably within a range of 50 to 150 nm. The primary particle diameter of the pigments can be measured by an electron microscope, a gas or solute adsorption method, an air flow method, an X-ray small angle scattering method, or the like. The particle diameter of the pigments after dispersion can be measured by a centrifugal sedimentation method, a laser diffraction method (light scattering method), an ESA method, a capillary method, an electron microscope method, or the like.

[Aqueous Ink]

The water used in aqueous inks is preferably pure water or ultra-pure water passed through a purification process such as ion exchange, distillation, or the like. Examples of the water-soluble organic solvent include ketones such as acetone, methyl ethyl ketone, methyl butyl ketone, methyl isobutyl ketone, and the like; alcohols such as methanol, ethanol, 2-propanol, 2-methyl-1-propanol, 1-butanol, 2-methoxyethanol, and the like; ethers such as tetrahydrofuran, 1,4-dioxane, 1,2-dimethoxyethane, and the like; dimethylformamide, N-methylpyrrolidone, 2-pyrrolidone, LEG-1, glycerol, diethylene glycol, trimethylolpropane, and/or analogies thereof.

An aqueous ink is produced by dispersing a colorant such as the pigment or the like in water or the mixed solvent of water and a water-soluble organic solvent, but the pigment is generally dispersed by using a resin for dispersion. Examples of a stirring disperser for dispersing the pigment include various dispersers such as an ultrasonic homogenizer, a high-pressure homogenizer, a paint shaker, a ball mill, a beads mill, a roll mill, a sand mill, a sand grinder, a Dyno-mill, Disper mat, a SC mill, a nanomizer, and the like. Also, a binder resin can be used for film formation and adhesion to a film. The resin for dispersion and the binder resin used may be the same or combination of several types. In general, water-soluble or water-dispersible urethane resin, acrylic resin, polyester resin, and the like can be used. If required, a drying inhibitor, a penetrant, a surfactant, or another additive is added for preparing an ink. A high-concentration pigment dispersion (mill base) can be formed in advance and then appropriately diluted, and then additives can be added for preparing an ink.

An aqueous ink preferably contains a resin having a polar group. Examples of the resin having a polar solvent and used in the present invention include natural polymers, e.g., proteins such as glue, gelatin, casein, albumin, and the like; natural rubbers such as gum Arabic, gum tragacanth, and the like; glucosides such as saponin, and the like; alginic acid derivatives such as alginic acid, alginic acid propylene glycol ester, triethanolamine alginate, ammonium alginate, and the like; cellulose derivatives such as methyl cellulose, carboxymethyl cellulose, hydroxyethyl cellulose, ethylhydroxyethyl cellulose, and the like; and synthetic polymers, e.g., polyvinyl alcohols; polyvinylpyrrolidones; acrylic resins such as polyacrylic acid, acrylic acid-acrylonitrile copolymers, potassium acrylate-acrylonitrile copolymers, vinyl acetate-acrylic acid ester copolymers, acrylic acid-acrylic acid alkyl ester copolymers, and the like; styrene-acrylic acid resins such as styrene-acrylic acid copolymers, styrene-methacrylic acid copolymers, styrene-methacrylic acid-acrylic acid alkyl ester copolymers, styrene-α-methylstyrene-acrylic acid copolymers, styrene-α-methylstyrene-acrylic acid-acrylic acid alkyl ester copolymers, and the like; styrene-malic acid; styrene-maleic anhydride; vinylnaphthalene-acrylic acid copolymers; vinylnaphthalene-maleic acid copolymers; vinyl acetate copolymers such as vinyl acetate-ethylene copolymers, vinyl acetate-fatty acid vinylethylene copolymers, vinyl acetate-maleic acid ester copolymers, vinyl acetate-crotonic acid copolymers, vinyl acetate-acrylic acid copolymers, and the like, and salts thereof.

Among these, preferred are polymer compounds having a carboxyl group (preferably in the form of a salt) (for example, the above-described styrene-acrylic acid resins, styrene-malic acid, styrene-maleic anhydride, vinylnaphthalene-acrylic acid copolymers, vinylnaphthalene-maleic acid copolymers, and vinyl acetate-acrylic acid copolymers), a copolymer of a hydrophobic group-containing monomer and a hydrophilic group-containing monomer, a polymer composed of a monomer having both a hydrophobic group and a hydrophilic group, and the salts, such as salts with alkali metals, diethylamine, ammonia, ethylamine, triethylamine, propylamine, isopropylamine, dipropylamine, butylamine, isobutylamine, triethanolamine, diethanolamine, aminomethylpropanol, morpholine, and the like. The copolymers preferably have a weight-average molecular weight of 3,000 to 300,000 and more preferably 10,000 to 250,000.

Also, it is preferred to use a water dispersion containing the polymer dispersed as fine particles in water. The water dispersion can be produced by appropriately neutralizing a synthetic polymer containing the above-described acid monomer such as acrylic acid, methacrylic acid, or the like. The content of the acid monomer is preferably 1% by weight to 15% by weight relative to the total monomers because an ink jet ink relatively stable over a relatively long period of time and having resistance to aggregation can be produced.

Also, the fine particles may be cross-linked. For example, the fine particles with a cross-linked structure can be formed by using a di- or higher-functional cross-linkable monomer at 0.1% by mass to 3% by mass relative to the total monomers. The cross-linkable monomer is preferably used in an amount not exceeding 3% by weight because the use of a excessively large amount of the cross-linkable monomer may cause gelling.

A preferred example of the water dispersion is a water dispersion prepared by appropriately neutralizing a synthetic polymer using styrene, (meth)acrylate having 1 to 8 carbon atoms, ethylene glycol di(meth)acrylate, (meth)acrylic acid, or the like.

The molecular weight of the resin having a polar group is preferably within a range of 10,000 to 2,000,000 and more preferably within a range of 20,000 to 250,000 in terms of weight-average molecular weight. The weight-average molecular weight of less than 20,000 may degrades the storage stability of an ink. The weight-average molecular weight of more than 250,000 influences dischargeability of an ink, and thus clogging or the like may easily occur. Also, the glass transition temperature is preferably within a range of −20° C. to +30° C. The particle diameter of the fine particles is within a range of 20 nm and 500 nm and more preferably within a range of 100 nm to 300 nm because an ink having no problem with dischargeability can be produced.

The particle diameter can be measured by a centrifugal sedimentation method, a laser diffraction method (light scattering method), an ESA method, a capillary method, an electron microscope method, or the like. Measurement by Microtrack UPA using a dynamic light scattering method is preferred.

(Surfactant or Low-Surface Tension Organic Solvent)

A surfactant or a low-surface tension organic solvent can be added to an aqueous ink in order to appropriately adjust surface tension. Examples of the surfactant include, but are not particularly limited to, various anionic surfactants, nonionic surfactants, cationic surfactants, ampholytic surfactants, and the like. Among these, anionic surfactants and nonionic surfactants are preferred.

Examples of the anionic surfactants include alkylbenzenesulfonic acid salts, alkylphenylsulfonic acid salts, alkylnaphthalenesulfonic acid salts, higher fatty acid salts, sulfuric acid ester salts of higher fatty acid esters, sulfonic acid salts of higher fatty acid esters, sulfuric acid ester salts and sulfonic acid salts of higher alcohol esters, higher alkyl sulfosuccinic acid salts, polyoxyethylene alkyl ether carboxylic acid salts, polyoxyethylene alkyl ether sulfuric acid salts, alkylphosphoric acid salts, polyoxyethylene alkyl ether phosphoric acid salts, and the like. Specific examples thereof include dodecylbenzene sulfonic acid salts, isopropylnaphthalene sulfonic acid salts, monobutylphenylphenol monosulfonic acid salts, monobutylbiphenyl sulfonic acid salts, dibutylphenylphenol disulfonic acid salts, and the like.

Examples of the nonionic surfactants include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid ethers, polyglycerin fatty acid esters, sucrose fatty acid esters, polyoxyethylene alkyl amines, polyoxyethylene fatty acid amides, fatty acid alkylolamides, alkyl alkanolamides, acetylene glycol, oxyethylene adduct of acetylene glycol, polyethylene glycol-polypropylene glycol black copolymers, alkylphenol ethoxylates, and the like. Among these, preferred are polyoxyethylene nonyl phenyl ether, polyoxyethylene octyl phenyl ether, polyoxyethylene dodecyl phenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adduct of acetylene glycol, polyethylene glycol-polypropylene glycol black copolymer, and alkylphenol ethoxylates.

Other surfactants which can be used include silicon-based surfactants such as polysiloxane oxyethylene adduct, and the like; fluorine-based surfactants such as perfluoroalkyl carboxylic acid salts, perfluoroalkyl sulfonic acid salts, oxyethylene perfluoroalkyl ethers, and the like; bio-surfactants such as spiculisporic acid, rhamnolipid, lysolecithin, and the like.

These surfactants can be used alone or as a mixture of two or more. In view of dissolution stability of the surfactant, HLB thereof is preferably within a range of 7 to 20.

Examples of commercial fluorine-based surfactants include Novec FC-4430 and FC-4432 (manufacture by Sumitomo 3M Limited), Zonyl FSO-100, FSN-100, FS-300 and FSO (manufactured by DuPont Company), F-Top EF-122A, EF-351, 352801, and 802 (manufactured by JEMCO Inc.), Megafac F-470, F-1405, F474, and F-444 (manufactured by DIC Corporation), Surflon S-111, S-112, S-113, S121, S131, S132, S-141, and S-145 (manufactured by Asahi Glass Co., Ltd.), Ftergent series (manufactured by Neos, Ltd.), Fluorad FC series (manufactured by Minnesota Mining and Manufacturing Company), Monflor (manufactured by Imperial Chemical Industries Ltd.), Licowet VPF series (manufactured by Farbwerke Hoechst Co., Ltd.), and the like.

Examples of the silicon-based surfactants include KF-351A, KF-642, Olfin PD-501, Olfin PD-502, and Olfin PD-570 (manufactured by Shin-Etsu Chemical Co., Ltd.), BYK347 and BYK348 (manufactured by BYK Chemie Japan KK), and the like.

Examples of polyoxyethylene alkyl ether-based surfactants include BT series (Nikko Chemicals Co., Ltd.), Nonipol series (Sanyo Chemical Industries, Ltd.), D- and P-series (Takemoto Oil & Fat Co., Ltd.), EMALEX DAPE series (Nihon Emulsion Co., Ltd.), Pegnol series (Toho Chemical Industry Co., Ltd.), and the like. Examples of polyethylene alkyl ester-based surfactants include Pegnol (Toho Chemical Industry Co., Ltd.).

Examples of acetylene glycol-based surfactants include Olfin E1010, STG, and Y (manufactured by Nisshin Chemical Industry Co., Ltd.), and Sarfinol 104, 82, 420, 440, 465, 485, and TG (manufactured by Air Products and Chemicals Inc.).

Also, a low-surface-tension organic solvent can be used. Examples of glycol ether compounds include diethylene glycol mono (C1-C8 alkyl) ethers, triethylene glycol mono (C1-C8 alkyl) ethers, propylene glycol mono (C1-C6 alkyl) ethers, and dipropylene glycol mono (C1-C6 alkyl) ethers. These can be used alone or as a mixture of two or more.

Specific examples thereof include ethylene glycol monomethyl ether, ethylene glycol monoethyl ether, ethylene glycol mono-iso-propyl ether, ethylene glycol monobutyl ether, ethylene glycol mono-tert-butyl ether, diethylene glycol monomethyl ether, diethylene glycol monoethyl ether, diethylene glycol monopropyl ether, diethylene glycol mono-iso-propyl ether, diethylene glycol monobutyl ether, diethylene glycol mono-tert-butyl ether, diethylene glycol monopentyl ether, diethylene glycol monohexyl ether, diethylene glycol monoheptyl ether, diethylene glycol monooctyl ether, triethylene glycol monomethyl ether, triethylene glycol monoethyl ether, triethylene glycol monopropyl ether, triethylene glycol monobutyl ether, triethylene glycol monopentyl ether, triethylene glycol monohexyl ether, triethylene glycol monoheptyl ether, triethylene glycol monooctyl ether, propylene glycol monomethyl ether, propylene glycol monoethyl ether, propylene glycol monopropyl ether, propylene glycol mono-iso-propyl ether, propylene glycol monobutyl ether, propylene glycol mono-tert-butyl ether, propylene glycol monopentyl ether, propylene glycol monohexyl ether, dipropylene glycol monomethyl ether, dipropylene glycol monoethyl ether, dipropylene glycol monopropyl ether, dipropylene glycol mono-iso-propyl ether, dipropylene glycol monobutyl ether, dipropylene glycol monopentyl ether, dipropylene glycol monohexyl ether, and the like.

The glycol ether, the surfactant, or the like can be used for adjusting surface tension of an ink. Specifically, the surfactant can be appropriately added so that the surface tension of an ink is 15 mN/m to 30 mN/m or less, and the amount of the surfactant added is preferably within a range of about 0.1% to 10% by mass and more preferably 0.3% to 2% by mass relative to an ink composition. The surface tension is more preferably within a range of 16 to 28 and most preferably within a range of 18 to 25.

(Wetting Agent)

Similarly, a wetting agent can be further added to an aqueous ink for the purpose of preventing drying of the ink. The content of the wetting agent for preventing drying in the ink is preferably 3% to 50% by mass. The wetting agent is not particularly limited, but is preferably miscible with water and has the effect of preventing clogging of a head of an ink jet printer. Examples thereof include diol compounds such as glycerin, ethylene glycol, diethylene glycol, triethylene glycol, polyethylene glycol having a molecular weight of 2,000 or less, propylene glycol, dipropylene glycol, tripropylene glycol, 1,3-propylene glycol, isopropylene glycol, isobutylene glycol, 1,2-butanediol, 1,4-butanediol, 1,2-pentanediol, 1,5-pentanediol, 1,2-hexanediol, 1,6-hexanediol, 2-methylpentane-2,4-diol, 1,2-heptanediol, 1,2-nonanediol, 1,2-octanediol, 1,2-hexanediol, 1,2-heptanediol, 1,2-nonanetiol, 1,2-octanediol, and the like; 1,4-butanediol, 1,3-butanediol, mesoerythritol, pentaerythritol, nitrogen-containing heterocyclic compounds such as N-methyl-2-pyrrolidone, N-hydroxyethyl-2-pyrrolidone, 2-pyrrolidone, 1,3-diemthylimidazolidinone, ∈-caprolactam, and the like. In particular, propylene glycol and 1,3-butyl glycol have safety and the excellent effect on ink drying and dischargeability.

(Penetrant)

Further, a penetrant can be added to an aqueous ink for the purpose of improving permeability to a film used as a recording medium and adjusting a dot diameter on the recording medium. Examples of the penetrant include lower alcohols such as ethanol, isopropyl alcohol, and the like; alkyl alcohol ethylene oxide adducts such as ethylene glycol hexyl ether, diethylene glycol butyl ether, and the like; alkyl alcohol propylene oxide adducts such as propylene glycol propyl ether and the like. The content of the penetrant in an ink is preferably 0.01% to 10% by mass.

In addition, if required, an antiseptic agent, a viscosity adjuster, a pH adjuster, a chelating agent, a plasticizer, an antioxidant, an ultraviolet absorber, and the like can be added. In the present invention, an aqueous ink having a surface tension at 25° C. within a range of 15 mN/m to 30 mN/m and a viscosity of 5 mPa·s or less is preferably used from the viewpoint that ink jet printing can be satisfactorily performed.

[Method for Producing Aqueous Ink]

A method for producing an aqueous ink is not limited. An aqueous ink may be produced by feeding and dispersing a colorant such as the pigment, the resin having a polar group, water or a water-soluble organic solvent, and, if required, additives such as the surfactant or by previously forming a mill base of a colorant such as a pigment at a high concentration, diluting the mill base, and then adding appropriate additives. The latter method of producing an aqueous ink after forming the mill base is described below.

Methods for producing a mill base include:

(1) A method in which a colorant is added to an aqueous medium containing a pigment dispersant and water and then dispersed in the aqueous medium by using a stirring disperser to prepare an aqueous pigment dispersion.

(2) A method in which a colorant and a pigment dispersant are kneaded by using a kneader such as two rollers, a mixer, or the like, and the resultant kneaded product is added to an aqueous medium containing water to prepare an aqueous pigment dispersion by using a stirring-disperser.

(3) A method in which a colorant is added to a solution prepared by dissolving a pigment dispersion in an organic solvent compatible with water, such as methyl ethyl ketone, tetrahydrofuran, or the like, and a white pigment is dispersed in the organic solution by using a stirring-disperser and emulsified through phase inversion with an aqueous medium, and then the organic solvent is distilled off to prepare an aqueous pigment dispersion.

Examples of the stirring disperser include an ultrasonic homogenizer, a high-pressure homogenizer, a paint shaker, a ball mill, a roll mill, a sand mill, a sand grinder, a Dyno-mill, Disper mat, a SC mill, a nanomizer, and the like. These may be used alone or in combination of two or more.

[Oil-Based Ink]

An oil-based ink containing a high-boiling-point solvent as a base is preferably used for preventing clogging of a head or the like. Examples of a nonpolar solvent include long-chain fatty acid esters, vegetable oil esters, higher fatty acids, vegetable oil, hydrocarbons, higher alcohols, and the like. Examples of a solvent with high polarity include lower alcohols, glycols, glycol ethers, glycol esters, lower alcohol esters, pyrrolidones, and the like.

Specific examples of the nonpolar solvent include methyl oleate, ethyl oleate, isopropyl oleate, isobutyl oleate, methyl linoleate, isobutyl linoleate, ethyl linoleate, methyl soybean oil, isobutyl soybean oil, butyl linseed oil, soybean oil, linseed oil, castor oil; Nisseki Naphtesol H, No. 0 Solvent H, Isosol 300, Isosol 400, AF-5, AF-6, and AF-7 manufactured by Shin-Nippon Oil Corporation, and Exxol D80, Exxol D110, Exxol D130, and Exxol D140 manufactured by Exxon Mobil Corporation (all trade names); isomyristyl alcohol, isopalmityl alcohol, isostearyl alcohol, oleyl alcohol, isononanoic acid, isomyristic acid, hexadecanoic acid, isopalmitic acid, oleic acid, isostearic acid, and the like.

Examples of the solvent with high polarity include ethylene glycol, diethylene glycol, glycerin, xylitol, dipropylene glycol monomethyl ether, tripropylene glycol monomethyl ether, ethylene glycol monobutyl ether, diethylene glycol monobutyl ether, diethylene glycol diethyl ether, triethylene glycol monobutyl ether, tetraethylene glycol dimethyl ether, propylene glycol monomethyl ether monoacetate, dipropylene glycol monomethyl ether, isopropyl acetate, pyrrolidone, N-methylpyrrolidone, and the like.

Also, when quick drying is regarded as important, a highly volatile solvent can be used as a mixture with the above-described solvent or used singly, and examples of the highly volatile solvent includes alkyl alcohols such as ethanol, 2-propanol, and the like; ketones such as acetone, methyl ethyl ketone, and the like; aromatic hydrocarbons such as toluene, xylene, and the like; esters such as ethyl acetate and the like; amides such as dimethylformamide, diemthylacetamide, and the like; ethers such as dioxane, tetrahydrofuran, and the like.

In addition, examples of a solvent suitable for so-called eco-solvent inks not containing cyclohexanone in view of safety in recent years include cyclic esters such as γ-butyrolactone and the like; cyclic ethers such as dioxane, trioxane, furan, tetrahydrofuran, methyl tetrahydrofuran, methylfuran, tetrahydropyran, furfural, and the like; linear esters having 5 to 7 carbon atoms, such as butyl formate, isoamyl formate, isobutyl formate, hexyl formate, butyl acetate, propyl acetate, isopropyl acetate, isobutyl acetate, isoamyl acetate, pentyl acetate, ethyl propionate, propyl propionate, isopropyl propionate, butyl propionate, methyl butyrate, ethyl butyrate, propyl butyrate, isopropyl butyrate, methyl isobutyrate, diethyl malonate, diethyl oxalate, ethyl lactate, butyl lactate, dimethyl malonate, and the like; linear ketones such as diethyl ketone, methyl isoamyl ketone, methyl isobutyl ketone, methyl propyl ketone, methyl butyl ketone, methyl pentyl ketone, ethyl propyl ketone, ethyl butyl ketone, dipropyl ketone, diisopropyl ketone, tert-butyl methyl ketone, methyl isopropyl ketone, acetyl ketone, acetonitrile acetone, and the like. These solvents can be used as a mixture with the solvent described above or used singly.

Like the aqueous ink, the oil-based ink can be produced by dispersing a colorant such as the pigment or the like in an organic solvent. Even in the oil-based ink, the pigment is generally dispersed by using a resin for dispersion. The same stirring disperser as for the aqueous ink can be used for dispersing a pigment. Also, a binder resin can be used for the purpose of film formation and adhesion to a film. The resin for dispersion and the binder resin may be the same or combination of several types may be used. In general, an oil-soluble urethane resin, acrylic resin, polyester resin, vinyl chloride resin, vinyl acetate resin, and the like are used.

Also, if required, a stabilizer such as an antioxidant, an ultraviolet absorber, or the like, a surfactant, a binder resin, etc. can be added. For example, BHA (2,3-butyl-4-oxyanisole), BIT (2,6-di-tert-butyl-P-cresol), or the like can be used as the antioxidant; a compound such as a benzophenone-based or benzotriazole-based compound or the like can be used as the ultraviolet absorber; and any one of anionic, cationic, amphoteric, and nonionic surfactants can be used.

Specific examples of a resin which can be used as the binder resin include acrylic resins, styrene acrylic resins, rosin-modified resins, phenol resins, terpene-based resins, polyester resins, polyamide resins, epoxy resins, and the like.

[UV Curable Ink]

An ultraviolet curable compound, a photopolymerization initiator, or the like is used for an UV curable ink because a printed coating film is cured with ultraviolet light or the like. Any type can be used, but an ultraviolet curable compound with low viscosity is preferably appropriately selected because excessively high viscosity may impair dischargeability. Also, there are a radical polymerization type and a cationic polymerization type according to reaction mechanisms. In order to produce an ink having a high curing drying speed, a compound having an ethylenic double bond, such as a (meth)acrylate or the like, is preferably used as the ultraviolet curable compound.

Specific examples of the compound having an ethylenic double bond include a monofunctional monomer having one ethylenic double bond and a polyfunctional monomer having two or more ethylenic double bonds, and these monomers can be used in combination or two or more. In addition, a (meth)acrylate oligomer or a tri- or more functional acrylate is preferably contained, but such a compound is preferably used within a range of 2% to 20% by mass relative to the total amount of compounds having an ethylenic double bond because the compound has high viscosity, and particularly the (meth)acrylate oligomer has relatively higher viscosity than a monomer.

Examples of the monofunctional monomer include (meth) acrylates having a substituent such as methyl, ethyl, propyl, butyl, amyl, 2-ethylhexyl, isooctyl, nonyl, dodecyl, hexadecyl, octadecyl, cyclohexyl, benzyl, methoxyethyl, butoxyethyl, phenoxyethyl, nonylphenoxyethyl, glycidyl, dimethylaminoethyl, diethylaminoethyl, isobornyl, dicyclopentanyl, dicyclopentenyl dicyclopentenyloxyethyl, or the like, vinyl caprolactam, vinylpyrrolidone, N-vinylformamide, and the like. These may be used in combination of two or more.

Examples of the polyfunctional monomer include di(meth) acrylates of 1,3-butylene glycol, 1,4-butanediol, 1,5-pentanediol, 3-methyl-1,5-pentanediol, 1,6-hexanediol, neopentylglyol, 1,8-octanediol, 1,9-nonanediol, tricyclodecane dimethanol, ethylene glycol, polyethylene glycol, propylene glycol, dipropylene glycol, tripropylene glycol, polypropylene glycol, and the like; di(meth)acrylate of tris(2-hydroxyethyl) isocyanurate, di(meth)acrylate of diol produced by adding 4 or more moles of ethylene oxide or propylene oxide to 1 mole of neopentyl glycol; di(meth)acrylate of diol produced by adding 2 moles of ethylene oxide or propylene oxide to 1 mole of bisphenol A; di- or tri-(meth)acrylate of triol produced by adding 3 or more moles of ethylene oxide or propylene oxide to 1 mole of trimethylolpropane; di(meth) acrylate of diol produced by adding 4 or more moles of ethylene oxide or propylene oxide to 1 mole of bisphenol A; trimethylolpropane tri(meth)acrylate; pentaerythritol tri (meth)acrylate, dipentaerythritol poly(meth)acrylate; ethylene oxide-modified phosphoric acid (meth)acrylate; ethylene oxide-modified alkylphosphoric acid (meth)acrylate; and the like. These can be used in combination of two or more.

Examples of the (meth)acrylate oligomer include urethane (meth)acrylate oligomers, epoxy(meth)acrylate oligomers, polyester(meth)acrylate oligomers, and the like, which may be used in combination of two or more.

Preferred examples of the photopolymerization initiator include benzoin isobutyl ether, 2,4-diethylthioxanthone, 2-isopropylthioxanthone, benzyl, 2,4,6-trimethylbenzoyldiphenyl phosphine oxide, 6-trimethylbenzoyldiphenyl phosphine oxide, 2-benzyl-2-dimethylamino-1-(4-morpholinophenyl)-butan-1-one, bis(2,6-dimethoxybenzoyl)-2,4,4-trimethylpentyl phosphine oxide, and the like. Such a photopolymerization initiator may be combined with a molecular cleavage-type photopolymerization initiator such as 1-hydroxycyclohexyl phenyl ketone, benzoin ethyl ether, benzyl dimethyl ketal, 2-hydroxy-2-methyl-1-phenyl propan-1-one, 1-(4-isopropylphenyl)-2-hydroxy-2-methylpropan-1-one, or 2-methyl-1-(4-methylthiophenyl)-2-morpholinopropan-1-one, or the like, and further combined with a hydrogen abstraction-type photopolymerization initiator such as benzophenone, 4-phenylbenzophenone, isophthalphenone, 4-benzoyl-4'-methyl-diphenyl sulfide, or the like.

Also, the photopolymerization initiator can be combined with a sensitizer, for example, an amine which does not produce addition reaction with the polymerizable components described above, such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, 4,4'-bis(diethylamino) benzophenone, or the like. Of course, the photopolymerization initiator and the sensitizer which have excellent solubility in the ultraviolet curable compound and do not inhibit ultraviolet permeability are preferably selected and used.

In order to enhance storage stability of an ink jet ink, a polymerization inhibitor such as hydroquinone, methoquinone, di-tert-butyl hydroquinone, p-methoxyphenol, butylhydroxytoluene, nitrosoamine salt, or the like may be added to the ink within a range of 0.01% to 2% by mass.

Also, a dispersant may be used and is preferably used for the purpose of enhancing dispersion stability of a pigment. Examples of the dispersant include, but are not limited to, Ajisper PB821, PB822, and PB817 manufactured by Ajinomoto Fine-Techno Co., Ltd., Solsperse 24000GR, 32000, 33000, and 39000 manufactured by Avicia Ltd., Disparlon DA-703-50, DA-705, and DA-725 manufactured by Kusumoto Chemicals, Ltd., and the like. The amount of the dispersant used is preferably within a range of 10% to 80% by mass and particularly preferably within a range of 20% to 60% by mass relative to the pigment. The amount of use of less than 10% by mass tends to cause unsatisfactory dispersion stability, and the amount of use exceeding 80% by mass tens to increase the viscosity of an ink and easily degrades discharge stability.

In addition, a nonreactive resin such as an acrylic resin, an epoxy resin, a terpene phenol resin, a rosin ester, or the like can be mixed for the purpose of imparting adhesiveness or the like to a recording medium.

The UV curable ink can be prepared by dispersing a pigment in a mixture which contains the pigment and an ultraviolet curable compound, and if required, a polymer dispersant and a resin by using a stirring disperser such as a beads mill or the like, which applies little shear, adding a photopolymerization initiator to the mixture and, if required, further adding additives such as a surface tension adjuster, etc., and then stirring and dissolving the resultant mixture. The UV curable ink can also be prepared by forming a pigment dispersion (mill base) at a high concentration, appropriately diluting the dispersion, and then adding ink additives.

A printing method is preferably ink jet printing, but printing may be performed by another printing method such as offset printing, typographic printing, gravure printing, silk screen printing, or the like, or combination of two or more of these printing methods.

EXAMPLES

The present invention is specifically described below by way of examples and comparative examples, but the present invention is not limited to these examples. In the examples, "parts" and "%" are on a mass basis unless otherwise specified.

[Evaluation of Coatability with Ink]

A A4-size film was coated with each ink by using a bar coater (No. 6), and a number of cissing defects was measured by visual observation.

Good: No cissing
Poor: One or more cissing defects

[Evaluation of Heat Resistance of Film]

After printing, the appearance of a film after drying at 90° C. or 1 minute was evaluated by visual observation.

Good: Substantially no appearance defect such as twisting, wrinkling, film deformation, or the like
Fair: Slight appearance defect such as twisting, wrinkling, film deformation, or the like
Poor: Significant appearance defect such as twisting, wrinkling, film deformation, or the like

[Evaluation of Printability]

Whether or not stable ink transfer (printing) was performed on a surface (A) of a recording medium was evaluated by visual observation.

Good: Good printing without fading, an unprintable portion, or the like
Poor: Defective printing with fading, an unprintable portion, or the like

[Evaluation of Ink Adhesion after Printing]

A peel test was performed with a cellophane tape (manufactured by Nichiban Co., Ltd.) to make evaluation by visual observation.

Good: Without peeling
Poor: With peeling

[Example of Preparation of Aqueous Ink]

A commercial cyan color ink (HP DESIGNJET L25500 manufactured by Hewlett-Packard Company) was used as an aqueous ink and evaluated with respect to ink coatability. As a result of measurement of the surface tension of the ink at a temperature of 25° C. by a platinum plate method using a tensiometer (manufactured by Kyowa Interface Science: CBVP-A3), the surface tension was 18.2 mN/m. Similarly, as a result of measurement of viscosity at 25° C. by using a viscometer (manufactured by DKK-Toa Corporation: TVE-25L), the viscosity was 3.22 mPa·s.

A printed material using an aqueous ink was prepared by ink jet printing on a surface (A) of a recording medium by using an ink jet printer "HP DESIGNJET L25500" (manufactured by Hewlett-Packard Company).

[Preparation Example of Solvent-Type Ink 1]

In a polyethylene vessel, 20 parts of cyan pigment Fastogen Blue TGR (C. I. Pigment Blue 15:3, manufactured by DIC Corporation), 6 parts of dispersant Ajisper PB821 (manufactured by Ajinomoto Fine-Techno Co., Ltd.), and 74 parts of diethylene glycol diethyl ether were placed together with zirconia beads, and shaken with a paint conditioner for 2 hours to prepare a cyan pigment dispersion A having a pigment concentration of 20%. Then, 12.5 parts of the dispersion A, 6.5 parts of resin VROH (manufactured by Dow Chemical Japan Ltd.), 0.5 parts of Eposizer W100EL (manufactured by DIC Corporation), 0.5 parts of KF54 (manufactured by Shin-Etsu Silicone Co., Ltd.), and, as a solvent, 46 parts of diethylene glycol diethyl ether, 15 parts of dipropylene glycol monomethyl ether, and 20 parts of γ-butyrolactone were heated to 60° C. under stirring. The resultant mixture was uniformly dissolved and mixed, then cooled to room temperature, and filtered with a membrane filter of 1.2 μm to prepare solvent-type ink 1. The ink 1 was evaluated with respect to ink coatability.

[Preparation example of solvent-type ink 2]

Solvent-type ink 2 was prepared by the same method as in the preparation example of the solvent-type ink 1 except that in the preparation example of the solvent-type ink 1, 41 parts of ethylene glycol monobutyl ether acetate and 40 parts of cyclohexane were used as a solvent. The ink was evaluated with respect to ink coatability.

[Preparation Example of UV Curable Ink]

A commercial cyan color ink (UFJ-605C manufactured by Mimaki Engineering Co., Ltd.) was used as an UV curable ink and evaluated with respect to ink coatability.

A printed material using a solvent-type ink was prepared by ink jet printing on a surface (A) of a recording medium by using ink jet printers "VJ-1608HSJ" (manufactured by Mutoh Industries, Ltd.) and "Ramirez III:PJ-1634NX" (manufactured by Mutoh Industries, Ltd.). A printed material using a UV curable ink was prepared by ink jet printing on a surface (A) of a recording medium by using an ink jet printer "UFJ-605C" (manufactured by Mimaki Engineering Co., Ltd.).

Example 1

A resin mixture containing 20 parts of a norbornene-based monomer ring-opened polymer ["Apel APL 6015T" manufactured by Mitsui Chemicals Inc., MFR: 10 g/10 min (260° C., 21.18 N), glass transition point: 145° C.; hereinafter referred to as "COC(1)"] and 80 parts of a norbornene-based monomer ring-opened polymer ["Apel APL 8008T" manufactured by Mitsui Chemicals Inc., MFR: 15 g/10 min (260° C., 21.18 N), glass transition point: 70° C.; hereinafter referred to as "COC(3)"] was used as a resin for a layer (A).

This resin was supplied to an extruder for the layer (A) (bore diameter 50 mm) and molten at 200° C. to 230° C., and the molten resin was supplied to a co-extrusion multilayer film producing apparatus having a feed block (temperature of the feed block and T-die: 250° C.) by a T-die chill-roll method and melt-extruded to form a film having a layer structure including a single layer (A) and a total thickness of 70 μm. A surface of the layer (A) was corona-treated. The surface tension with a wetting reagent (manufactured by Woko Pure Chemical Industries, Ltd., a mixed solution for a wet tension test) was 45 mN/m.

Example 2

A resin mixture containing 50 parts of COC(1) and 50 parts of COC(3) was used as a resin for a layer (A). A film having a layer structure including a single layer (A) and a total thickness of 30 μm was formed by the same method as in Example 1, and then a surface of the layer (A) was corona-treated. The surface tension with a wetting reagent was 45 mN/m.

Example 3

A resin mixture containing 60 parts of COC(1), 30 parts of COC(3), and 10 parts of linear medium-density polyethylene [density: 0.930 g/cm$^3$, melting point 125° C., MFR: 5 g/10 min (190° C., 21.18 N); hereinafter referred to as "LMDPE"] was used as a resin for a layer (A). A film having a layer structure including a single layer (A) and a total thickness of 30 μm was formed by melt extrusion according to the same method as in Example 1, and then a surface of the layer (A) was corona-treated. The surface tension with a wetting reagent was 45 mN/m.

Example 4

A resin mixture containing 60 parts of COC(1), 30 parts of COC(3), and 10 parts of a propylene-α-olefin random copolymer polymerized by using a metallocene catalyst [density: 0.900 g/cm$^3$, melting point 135° C., MFR: 4 g/10 min (230° C., 21.18 N); hereinafter referred to as "MRCP"] was used as a resin for a layer (A). A film having a layer structure including a single layer (A) and a total thickness of 20 μm was formed by melt extrusion according to the same method as in Example 1, and then a surface of the layer (A) was corona-treated. The surface tension with a wetting reagent was 45 mN/m.

Example 5

A resin mixture containing 40 parts of COC(1), 40 parts of COC(3), and 20 parts of LMDPE was used as a resin for a layer (A). A film having a layer structure including a single layer (A) and a total thickness of 50 μm was formed by melt extrusion according to the same method as in Example 1, and then a surface of the layer (A) was corona-treated. The surface tension with a wetting reagent was 45 mN/m.

Example 6

A resin mixture containing 60 parts of a norbornene-based monomer ring-opened polymer ["Apel AP6013T" manufactured by Mitsui Chemicals Inc., MFR: 15 g/10 min (260° C., 21.18 N), glass transition point: 125° C.; hereinafter referred to as "COC(2)"] and 40 parts of high-density polyethylene [density: 0.960 g/cm$^3$, melting point 128° C., MFR: 10 g/10 min (190° C., 21.18 N); hereinafter referred to as "HDPE"] was used as a resin for a layer (A). A film having a layer structure including a single layer (A) and a total thickness of 40 μm was formed by melt extrusion according to the same method as in Example 1, and then a surface of the layer (A) was corona-treated. The surface tension with a wetting reagent was 43 mN/m.

Example 7

A resin mixture containing 70 parts of COC(1), 10 parts of COC(3), 10 parts of LMDPE, and 10 parts of MRCP was used as a resin for a layer (A). Also, MRCP was used as a resin for a layer (B). These resins were supplied to an extruder for the layer (A) (bore diameter 50 mm) and an extruder for the layer (B) (bore diameter 50 mm), respectively, and molten at 200° C. to 230° C., and the molten resins were supplied to a co-extrusion multilayer film producing apparatus having a feed block (temperature of the feed block and T-die: 250° C.) by a T-die chill-roll method and co-melt-extruded to form a co-extruded multilayer film having a multilayer structure with (A)/(B)=20 μm/20 μm, and a total thickness of 40 μm. A surface of the layer (A) was corona-treated. The surface tension with a wetting reagent was 40 mN/m.

Example 8

A resin mixture containing 50 parts of COC(1) and 50 parts of COC(3) was used as a resin for a layer (A). Also, MRCP was used as a resin for a intermediate layer (B), and a resin mixture containing 50 parts of COC(1) and 50 parts of COC (3) was used as a resin for an outermost layer (hereinafter the outermost layer is referred to as a "layer (C)"). These resins were supplied to an extruder for the layer (A) (bore diameter 50 mm), an extruder for the layer (B) (bore diameter 50 mm), and an extruder for the layer (C) (bore diameter 50 mm), respectively, and molten at 230° C. to 250° C., and the molten resins were supplied to a co-extrusion multilayer film producing apparatus having a feed block (temperature of the feed block and T-die: 250° C.) by a T-die chill-roll method and co-melt-extruded to form a co-extruded multilayer film having a multilayer structure with (A)/(B)/(C)=10 μm/30 μm/10 μm, and a total thickness of 50 μm. A surface of the layer (A) was corona-treated as in Example 1. The surface tension with a wetting reagent was 42 mN/m.

Example 9

A resin mixture containing 40 parts of COC(1) and 60 parts of COC(3) was used as a resin for a layer (A). Also, LMDPE was used as a resin for a layer (B), and a resin mixture containing 40 parts of COC(1) and 60 parts of COC(3) was used as a resin for a layer (C). A co-extruded multilayer film was formed by the same method as in Example 8 so that the thicknesses of the layers were 10 μm/30 μm/10 μm (total of 50 μm), and then a surface of the layer (A) was corona-treated. The surface tension with a wetting reagent was 43 mN/m.

Example 10

A resin mixture containing 70 parts of COC(1) and 30 parts of an ethylene-methyl(meth)acrylate copolymer [density: 0.940 g/cm$^3$, MA content 18%, hereinafter referred to as "MA1"] as an acid-modified polyolefin resin was used as a resin for a layer (A). Also, a resin mixture containing 80 parts of LMDPE and 20 parts of COC(3) was used as a resin for a layer (B). Further, and a resin mixture containing 70 parts of COC(1), 20 parts of LMDPE, and 10 parts of HDPE was used as a resin for a layer (C). A co-extruded multilayer film was formed by the same method as in Example 8 so that the thicknesses of layers were 20 μm/30 μm/20 μm (total of 70 μm), and then a surface of the layer (A) was corona-treated. The surface tension with a wetting reagent was 43 mN/m.

Example 11

A resin mixture containing 60 parts of COC(1), 20 parts of COC(3), and 20 parts of an ethylene-methyl acrylate-maleic anhydride copolymer [density: 1.00 g/cm$^3$, copolymer content 15%; hereinafter referred to as "MA2"] as an acid-modified polyolefin resin was used as a resin for a layer (A). Also, a resin mixture containing 80 parts of MRCP and 20 parts of COC(3) was used as a resin for a layer (B). Further, and a resin mixture containing 70 parts of COC(3) and 30 parts of LMDPE was used as a resin for a layer (C). A co-extruded multilayer film was formed by the same method as in Example 8 so that the thicknesses of the layers were 20 μm/30 μm/20 μm (total of 70 μm), and then a surface of the layer (A) was corona-treated. The surface tension with a wetting reagent was 43 mN/m.

Example 12

A resin mixture containing 50 parts of COC(1) and 50 parts of COC(3) was used as a resin for a layer (A). Also, a resin mixture containing 50 parts of LMDPE and 50 parts of MRCP was used as a resin for a layer (B). Further, and a resin mixture containing 20 parts of COC(1), 60 parts of COC(2), and 20 parts of LMDPE was used as a resin for a layer (C). A co-extruded multilayer film was formed by the same method as in Example 8 so that the thicknesses of the layers were 20 μm/30 μm/20 μm (total of 70 μm), and then a surface of the layer (A) was corona-treated. The surface tension with a wetting reagent was 43 mN/m.

Example 13

MA1 was used as a resin for a layer (A). Also, homopolypropylene [MFR: 10 g/10 min (230° C., 21.18 N), melting point: 163° C.; hereinafter referred to as "HOPP"] was used as a resin for a layer (B). A co-extruded multilayer film including layers with thicknesses of 24 μm/96 μm (total of 120 μm) was formed by the same method as in Example 7. Then, a surface of the layer (A) was corona-treated. The surface tension with a wetting reagent was 40 mN/m.

Example 14

A recording medium for an ink jet ink was produced by the same method as in Example 13 except that in Example 13, the thicknesses of the layers (A)/(B) were 14 μm/56 μm (total of 70 μm).

Example 15

A recording medium for an ink jet ink was produced by the same method as in Example 13 except that in Example 13, the thicknesses of the layers (A)/(B) were 6 μm/24 μm (total of 30 μm).

Example 16

A recording medium for an ink jet ink was produced by the same method as in Example 13 except that the acid-modified olefin resin in the layer (A) of Example 13 was replaced by MA2.

Example 17

A recording medium for an ink jet ink was produced by the same method as in Example 13 except that the acid-modified olefin resin in the layer (A) of Example 13 was replaced by an ethylene-methyl acrylate-maleic anhydride copolymer [density: 1.00 g/cm$^3$, copolymer content 15%; hereinafter referred to as "MA3"].

Example 18

A recording medium for an ink jet ink was produced by the same method as in Example 13 except that the resin for the layer (A) of Example 13 was replaced by a mixture containing 50% of MA1 and 50% of a propylene-ethylene copolymer [density: 0.900 g/cm$^3$, MFR: 7 to 9 g/10 min (230° C., 21.18 N), melting point: 150° C.; hereinafter referred to as "COPP"].

Example 19

A recording medium for an ink jet ink was produced by the same method as in Example 13 except that the resin for the layer (A) of Example 13 was replaced by a mixture containing 20% of MA1 and 80% of COPP.

Example 20

A recording medium for an ink jet ink was produced by the same method as in Example 18 except that HOPP of the layer (B) of Example 19 was replaced by HDPE.

Example 21

A recording medium for an ink jet ink was produced by the same method as in Example 18 except that HOPP of the layer (B) of Example 19 was replaced by medium-density polyethylene [density: 0.934 g/cm$^3$, MFR: 5.3 g/10 min (190° C., 21.18 N), melting point 119° C.; hereinafter referred to as "MDPE"].

Example 22

A recording medium for an ink jet ink was produced by the same method as in Example 13 except that the acrylic acid-modified resin of Example 13 was replaced by an ethylene-(meth)acrylic acid copolymer [density: 0.940 g/cm$^3$, acid modification rate 12%; hereinafter referred to as "MA4"].

Example 23

A recording medium for an ink jet ink was produced by the same method as in Example 13 except that in Example 13, the layer structure of the film was changed to a layer structure having (A)/(B) layer thicknesses of 6 μm/114 μm (total of 120 μm).

Example 24

A recording medium for an ink jet ink was produced by the same method as in Example 13 except that in Example 13, the layer structure of the film was changed to a layer structure having (A)/(B) layer thicknesses of 30 μm/90 μm (total of 120 μm).

Comparative Example 1

A single-layer film of 30 μm was formed by using HOPP as a resin for a layer (A), and then one of the surfaces was corona-treated. The surface tension with a wetting reagent was 43 mN/m.

Comparative Example 2

A single-layer film of 30 μm was formed by using, as a resin for a layer (A), linear low-density polyethylene [density: 0.905 g/cm$^3$, melting point 90° C., MFR: 5 g/10 min (190° C., 21.18 N); hereinafter referred to as "LLDPE"], and then one of the surfaces was corona-treated. The surface tension with a wetting reagent was 40 mN/m.

Comparative Example 3

A recording medium for an ink jet ink was produced by the same method as in Example 13 except that the acid-modified polyolefin resin in the layer (A) of Example 13 was replaced by COPP.

Comparative Example 4

A recording medium for an ink jet ink was produced by the same method as in Example 13 except that the acid-modified polyolefin resin in the layer (A) of Example 13 was replaced by HDPE.

Ink jet printing with inks was performed on each of the recording media produced as described above. The evaluation results of the resultant printed materials are shown in Tables 1 to 4.

TABLE 1

| | | | Example | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 |
| Film structure (parts by mass) and thickness of layer | Layer (C) | COC(1) | | | | | | | | 50 | 40 | 70 | | 20 |
| | | COC(2) | | | | | | | | | | | | 60 |
| | | COC(3) | | | | | | | | 50 | 60 | | 70 | |
| | | HDPE | | | | | | | | | | 10 | | |
| | | LMDPE | | | | | | | | | | 20 | 30 | 20 |
| | | Thickness (μm) | | | | | | | | 10 | 10 | 20 | 20 | 20 |
| | Layer (B) | LMDPE | | | | | | | | | | 100 | 80 | | 50 |
| | | MRCP | | | | | | | | 100 | 100 | | | 80 | 50 |
| | | COC(3) | | | | | | | | | | 20 | 20 | |
| | | Thickness (μm) | | | | | | | | 20 | 30 | 30 | 30 | 30 | 30 |
| | Layer (A) | COC(1) | 20 | 50 | 60 | 60 | 40 | | 70 | 50 | 40 | 70 | 60 | 50 |
| | | COC(2) | | | | | | 60 | | | | | | |
| | | COC(3) | 80 | 50 | 30 | 30 | 40 | | 10 | 50 | 60 | | 20 | 50 |
| | | HDPE | | | | | | 40 | | | | | | |
| | | LMDPE | | | 10 | | 20 | | 10 | | | | | |
| | | MRCP | | | | 10 | | | 10 | | | | | |
| | | MA1 | | | | | | | | | | 30 | | |
| | | MA2 | | | | | | | | | | | 20 | |
| | | Thickness (μm) | 70 | 30 | 30 | 20 | 50 | 40 | 20 | 10 | 10 | 20 | 20 | 20 |

Suitability for aqueous ink

| | 1 | 2 | 3 | 4 | 5 | 6 | 7 | 8 | 9 | 10 | 11 | 12 |
|---|---|---|---|---|---|---|---|---|---|---|---|---|
| Coatability with ink | Good | Good | Good | Good | Good | Good | Good | Good | Good | Good | Good | Good |
| Heat resistance of film | Good | Good | Good | Good | Good | Good | Good | Good | Good | Good | Good | Good |
| Printability | Good | Good | Good | Good | Good | Good | Good | Good | Good | Good | Good | Good |
| Adhesion of ink | Good | Good | Good | Good | Good | Good | Good | Good | Good | Good | Good | Good |

Suitability for solvent-type ink 1

| | 1 | 2 | 3 | 4 | 5 | 6 | 7 | 8 | 9 | 10 | 11 | 12 |
|---|---|---|---|---|---|---|---|---|---|---|---|---|
| Coatability with ink | Good | Good | Good | Good | Good | Good | Good | Good | Good | Good | Good | Good |
| Heat resistance of film | Good | Good | Good | Good | Good | Good | Good | Good | Good | Good | Good | Good |
| Printability | Good | Good | Good | Good | Good | Good | Good | Good | Good | Good | Good | Good |
| Adhesion of ink | Good | Good | Good | Good | Good | Good | Good | Good | Good | Good | Good | Good |

Suitability for solvent-type ink 2

| | 1 | 2 | 3 | 4 | 5 | 6 | 7 | 8 | 9 | 10 | 11 | 12 |
|---|---|---|---|---|---|---|---|---|---|---|---|---|
| Coatability with ink | Good | Good | Good | Good | Good | Good | Good | Good | Good | Good | Good | Good |
| Heat resistance of film | Good | Good | Good | Good | Good | Good | Good | Good | Good | Good | Good | Good |
| Printability | Good | Good | Good | Good | Good | Good | Good | Good | Good | Good | Good | Good |
| Adhesion of ink | Good | Good | Good | Good | Good | Good | Good | Good | Good | Good | Good | Good |

Suitability for UV-curable ink

| | 1 | 2 | 3 | 4 | 5 | 6 | 7 | 8 | 9 | 10 | 11 | 12 |
|---|---|---|---|---|---|---|---|---|---|---|---|---|
| Coatability with ink | Good | Good | Good | Good | Good | Good | Good | Good | Good | Good | Good | Good |
| Heat resistance of film | Good | Good | Good | Good | Good | Good | Good | Good | Good | Good | Good | Good |
| Printability | Good | Good | Good | Good | Good | Good | Good | Good | Good | Good | Good | Good |
| Adhesion of ink | Good | Good | Good | Good | Good | Good | Good | Good | Good | Good | Good | Good |

TABLE 2

|  |  | Example | | | | | | |
|---|---|---|---|---|---|---|---|---|
|  |  | 13 | 14 | 15 | 16 | 17 | 18 | 19 |
| Resin composition of layer (B) | HOPP | 100 | 100 | 100 | 100 | 100 | 100 | 100 |
| Thickness of layer (B) (μm) | | 96 | 56 | 24 | 96 | 96 | 96 | 96 |
| Resin composition of layer (A) | MA1 | 100 | 100 | 100 | | | 50 | 20 |
|  | MA2 | | | | 100 | | | |
|  | MA3 | | | | | 100 | | |
|  | MA4 | | | | | | | |
|  | COPP | | | | | | 50 | 80 |
| Thickness of layer (A) (μm) | | 24 | 14 | 6 | 24 | 24 | 24 | 24 |
| Total thickness of film (μm) | | 120 | 70 | 30 | 120 | 120 | 120 | 120 |
| Suitability for aqueous ink | | | | | | | | |
| Coatability with ink | | Good | Good | Good | Good | Good | Good | Good |
| heat resistance of film | | Good | Good | Good | Good | Good | Good | Good |
| Printability | | Good | Good | Good | Good | Good | Good | Good |
| Adhesion of ink | | Good | Good | Good | Good | Good | Good | Good |
| Suitability for solvent-type ink 1 | | | | | | | | |
| Coatability with ink | | Good | Good | Good | Good | Good | Good | Good |
| heat resistance of film | | Good | Good | Good | Good | Good | Good | Good |
| Printability | | Good | Good | Good | Good | Good | Good | Good |
| Adhesion of ink | | Good | Good | Good | Good | Good | Good | Good |
| Suitability for solvent-type ink 2 | | | | | | | | |
| Coatability with ink | | Good | Good | Good | Good | Good | Good | Good |
| heat resistance of film | | Good | Good | Good | Good | Good | Good | Good |
| Printability | | Good | Good | Good | Good | Good | Good | Good |
| Adhesion of ink | | Good | Good | Good | Good | Good | Good | Good |
| Suitability for UV-curable ink | | | | | | | | |
| Coatability with ink | | Good | Good | Good | Good | Good | Good | Good |
| heat resistance of film | | Good | Good | Good | Good | Good | Good | Good |
| Printability | | Good | Good | Good | Good | Good | Good | Good |
| Adhesion of ink | | Good | Good | Good | Good | Good | Good | Good |

TABLE 3

|  |  | Example | | | | |
|---|---|---|---|---|---|---|
|  |  | 20 | 21 | 22 | 23 | 24 |
| Resin composition of layer (B) | HOPP | | | 100 | 100 | 100 |
|  | HDPE | 100 | | | | |
|  | MDPE | | 100 | | | |
| Thickness of layer (B) (μm) | | 96 | 96 | 96 | 114 | 90 |
| Resin composition of layer (A) | MA1 | 50 | 50 | | 100 | 100 |
|  | MA4 | | | 100 | | |
|  | COPP | 50 | 50 | | | |
|  | HDPE | | | | | |
| Thickness of layer (A) (μm) | | 24 | 24 | 24 | 6 | 30 |
| Total thickness of film (μm) | | 120 | 120 | 120 | 120 | 120 |
| Suitability for aqueous ink | | | | | | |
| Coatability with ink | | Good | Good | Good | Good | Good |
| heat resistance of film | | Good | Fair | Good | Good | Good |
| Printability | | Good | Good | Good | Good | Good |
| Adhesion of ink | | Good | Good | Good | Good | Good |
| Suitability for solvent-type ink 1 | | | | | | |
| Coatability with ink | | Good | Good | Good | Good | Good |
| heat resistance of film | | Good | Fair | Good | Good | Good |
| Printability | | Good | Good | Good | Good | Good |
| Adhesion of ink | | Good | Good | Good | Good | Good |
| Suitability for solvent-type ink 2 | | | | | | |
| Coatability with ink | | Good | Good | Good | Good | Good |
| heat resistance of film | | Good | Fair | Good | Good | Good |
| Printability | | Good | Good | Good | Good | Good |
| Adhesion of ink | | Good | Good | Good | Good | Good |

TABLE 3-continued

|  | Example | | | | |
|---|---|---|---|---|---|
|  | 20 | 21 | 22 | 23 | 24 |
| Suitability for UV-curable ink | | | | | |
| Coatability with ink | Good | Good | Good | Good | Good |
| heat resistance of film | Good | Fair | Good | Good | Good |
| Printability | Good | Good | Good | Good | Good |
| Adhesion of ink | Good | Good | Good | Good | Good |

TABLE 4

|  | Comparative Example | | | |
|---|---|---|---|---|
|  | 1 | 2 | 3 | 4 |
| HOPP | 100 | | 100 | 100 |
| LLMDPE | | 100 | | |
| Thickness of layer (A) (μm) | 30 | 30 | 96 | 96 |
| COPP | | | 100 | |
| HDPE | | | | 100 |
| Thickness of layer (B) (μm) | 0 | 0 | 24 | 24 |
| Total thickness of film (μm) | 30 | 30 | 120 | 120 |
| Suitability for aqueous ink | | | | |
| Coatability with ink | Good | Good | Good | Good |
| heat resistance of film | Good | Poor | Good | Good |
| Printability | Good | Good | Good | Good |
| Adhesion of ink | Poor | Poor | Poor | Poor |

TABLE 4-continued

|  | Comparative Example | | | |
|---|---|---|---|---|
|  | 1 | 2 | 3 | 4 |
| Suitability for solvent-type ink 1 | | | | |
| Coatability with ink | Good | Good | Good | Good |
| heat resistance of film | Good | Poor | Good | Good |
| Printability | Good | Good | Good | Good |
| Adhesion of ink | Poor | Poor | Poor | Poor |
| Suitability for solvent-type ink 2 | | | | |
| Coatability with ink | Good | Good | Good | Good |
| heat resistance of film | Good | Poor | Good | Good |
| Printability | Good | Good | Good | Good |
| Adhesion of ink | Poor | Poor | Poor | Poor |
| Suitability for UV-curable ink | | | | |
| Coatability with ink | Good | Good | Good | Good |
| heat resistance of film | Good | Poor | Good | Good |
| Printability | Good | Good | Good | Good |
| Adhesion of ink | Poor | Poor | Poor | Poor |

INDUSTRIAL APPLICABILITY

An ink jet printed material of the present invention can be used for various purposes, for example, outdoor advertising (a poster, pennon, and the like), a label, wallpaper, a packaging film, a postcard, an OHP sheet, ink jet paper, a lot ticket, a document, etc.

The invention claimed is:

1. A method for producing an ink jet printed material comprising performing ink jet printing on a surface of a layer (A) of a single-layer or multi-layer film (I) including the layer (A), the layer (A) containing a cyclic polyolefin resin (a1) and/or a modified polyolefin resin (a2), the cyclic polyolefin resin (a1) being a norbornene-based copolymer which has a glass transition temperature of 70° C. to 180° C. and which is produced by copolymerizing a norbornene-based monomer with at least one olefin selected from the group consisting of ethylene, propylene, 1-butene, cyclobutene, cyclopentene, cyclohexene, and 1,4-hexadiene, and the modified polyolefin resin (a2) having a modification rate of 0.5% to 40% and being a copolymer of an olefin component, which is an alkene having 2 to 6 carbon atoms, and a (meth)acrylic acid ester component or an unsaturated carboxylic acid component.

2. The method for producing an ink jet printed material according to claim 1, wherein the film (I) is a multilayer film further including a resin layer (B) containing a polyolefin resin (b) as a main component.

3. The method for producing an ink jet printed material according to claim 2, wherein the layer (A) and the layer (B) are laminated by a co-extrusion lamination method.

4. The method for producing an ink jet printed material according to claim 1, wherein the layer (A) of the film (I) contains the cyclic polyolefin resin (a1) and the modified polyolefin resin (a2) at a total mass of 50 parts by mass or more in 100 parts by mass of resin components constituting the layer (A).

5. The method for producing an ink jet printed material according to claim 1, wherein ink jet printing is performed after the surface of the layer (A) is treated with a degree of surface treatment of 40 dyne/cm or more.

6. A recording medium for an ink jet ink comprising a laminate of a layer (A) containing a cyclic polyolefin resin (a1) and/or a modified polyolefin resin (a2) and a layer (B) containing a polyolefin resin (b), the cyclic polyolefin resin (a1) being a norbornene-based copolymer which has a glass transition temperature of 70° C. to 180° C. and which is produced by copolymerizing a norbornene-based monomer with at least one olefin selected from the group consisting of ethylene, propylene, 1-butene, cyclobutene, cyclopentene, cyclohexene, and 1,4-hexadiene, and the modified polyolefin resin (a2) having a modification rate of 0.5% to 40% and being a copolymer of an olefin component, which is an alkene having 2 to 6 carbon atoms, and a (meth)acrylic acid ester component or an unsaturated carboxylic acid component, wherein a thickness ratio of the layer (B) to a total thickness of the layer (A) and the layer (B) is 5 to 85%, and a surface of the layer (A) has 40 dyne/cm or more.

7. An ink jet printed material produced by ink jet printing on a surface of the layer (A) of the recording medium for an ink jet ink according to claim 6.

8. The ink jet printed material according to claim 7, wherein ink jet printing is performed by using an aqueous ink which contains at least a colorant, a resin having a polar group, and water or a water-soluble organic solvent and which has a surface tension at 25° C. within a range of 15 mN/m to 30 mN/m and a viscosity of 5 mPa·s or less.

* * * * *